United States Patent [19]

Higgins

[11] 4,409,251

[45] Oct. 11, 1983

[54] CONTROLLABLY MOISTURIZED MOLD RESISTANT CELLULOSIC FOOD CASINGS

[75] Inventor: Thomas E. Higgins, Riverside, Ill.

[73] Assignee: Union Carbide Corporation, Danbury, Conn.

[21] Appl. No.: 361,878

[22] Filed: Mar. 25, 1982

[51] Int. Cl.$^3$ .................. B65B 55/00; A23L 1/31; F16L 11/00

[52] U.S. Cl. .................. 426/413; 138/118.1; 426/105; 426/135; 428/36

[58] Field of Search .................. 428/36; 138/118.1; 426/105, 133, 135, 138, 326, 413, 415, 420, 512

[56] References Cited

U.S. PATENT DOCUMENTS

| | | | |
|---|---|---|---|
| 2,105,273 | 1/1938 | Smith | 156/203 |
| 2,144,899 | 1/1939 | Smith | 156/218 |
| 2,181,329 | 11/1939 | Hewitt | 138/118.1 |
| 2,910,380 | 10/1959 | Shiner | 427/439 |
| 2,983,949 | 5/1961 | Matecki | 17/42 |
| 2,984,574 | 5/1961 | Matecki | 138/118.1 |
| 3,135,613 | 6/1964 | Underwood | 138/118.1 |
| 3,222,192 | 12/1965 | Arnold et al. | 17/42 |
| 3,250,629 | 5/1966 | Turbak | 138/118.1 |
| 3,433,663 | 3/1969 | Underwood | 428/36 |
| 3,471,305 | 10/1969 | Marbach | 138/118.1 |
| 3,616,489 | 11/1971 | Voo et al. | 134/68 |
| 3,617,312 | 11/1971 | Rose . | |
| 3,657,769 | 4/1972 | Martinek | 138/118.1 |
| 3,809,576 | 5/1974 | Marbach | 138/118.1 |
| 3,914,445 | 10/1975 | Pavey | 426/326 |
| 3,935,320 | 2/1976 | Chiu et al. . | |
| 3,962,462 | 6/1976 | Burkwall, Jr. et al. | 426/512 |
| 4,049,835 | 9/1977 | Haas et al. | 426/326 |

OTHER PUBLICATIONS

Desrosier, "The Technology of Food Preservation" 4th Ed. AVI Publishing Co., Westport, Conn. pp. 282-287, (1979).

Hawley, "The Condensed Chemical Dictionary" 8th Ed. Van Nostrand Reinhold Co., New York, 1974.

Ross, Estimation of Water Activity in Intermediate Moisture Foods Food Technology, Mar. 1975, p. 26.

Journal of Food Science, vol. 41, p. 532, May-Jun. 1976.

*Primary Examiner*—William R. Dixon, Jr.
*Attorney, Agent, or Firm*—Dale Lynn Carlson

[57] ABSTRACT

Large size tubular cellulosic food casings used in making stuffed food products such as large sausage products, encased processed meat products, rolled meat products and the like, are controllably moisturized to an extent which permits elimination of any further pre-stuffing soaking and are provided with high concentrations of glycerine to maintain the water activity at a level sufficiently low to inhibit mold, yeast, and bacteria growth prior to stuffing the casing with foodstuff.

10 Claims, No Drawings

001
CONTROLLABLY MOISTURIZED MOLD RESISTANT CELLULOSIC FOOD CASINGS

DESCRIPTION

Field of the Invention

This invention relates to improved food casings and more particularly to large tubular cellulosic food casings, particularly fibrous food casings, which are controllably moisturized to obviate the need for any pre-stuffing soaking, and which are treated with higher than heretofore used concentrations of glycerine to maintain a low water activity in the casing and thereby to inhibit the formation and propagation of colonies of mold, yeast, and bacteria which would otherwise occur in such moisturized casings.

BACKGROUND OF THE INVENTION

Types of Casings

Artificial food casings used throughout the world in processing a great variety of meat and other food products, such as sausages of various types, cheese rolls, turkey rolls, and the like are customarily prepared from regenerated cellulose and other cellulose materials. Casings are of several different types and sizes to accommodate the different categories of food product to be prepared and are provided in supported or unsupported form, the supported casings, commonly referred to as "fibrous casings", having a fibrous support web embedded in the casing wall.

A common feature of many processed food products, particularly meat products, is that the mixture of comestible ingredients, commonly called an "emulsion", is stuffed into a casing under pressure, and processing of the food product is carried out after its encasement. The food product may also be stored and shipped while encased in the casing, though in many instances, and particularly with small sausage products such as frankfurters, the casing is removed from the food product after completion of the processing.

The designation "small food casings" refers generally to those casings employed in the preparation of small size sausage products such as frankfurters. As the name suggests, this type of food casing is small in stuffed diameter, generally having a diameter within the range of from about 15 mm to about 40 mm, and is most usually supplied as thin-walled tubes of very great length. For convenience in handling, these casings, which may be 20 to 50 meters in length or even longer, are shirred and compressed to produce what is commonly referred to as "shirred casing sticks" of from about 20 cm to about 60 cm in length. Shirring machines and the products thereof are shown in U.S. Pat. Nos. 2,983,949 and 2,984,574 among others.

"Large size food casings", the common designation for casings used in the preparation of generally larger food products, such as salami and bologna sausages, meat loaves, cooked and smoked ham butts and the like, are produced in stuffed diameter sizes of from about 50 mm to about 200 mm or even larger. In general, such casings have a wall thickness about three times greater than "small size casings" wall thickness, and are provided with a fibrous web reinforcement embedded in the wall, though they may be prepared without such supporting medium. Traditionally the large size tubular casings have been supplied to the food processor in flattened condition, cut to predetermined lengths of from about 0.6 m to about 2.2 m. Improvements in shirring and packaging techniques and increased use of automatic stuffing equipment has increased the demand for supplying large size casings of both the fibrous and the unsupported types in the form of shirred sticks containing up to about 30 m and even more of casing.

Large size tubular cellulosic food casings suitable for use as casings of the present invention may be prepared by any of several known methods. The casings are flexible, seamless tubing formed of regenerated cellulose, cellulose ethers and the like, and can be prepared by known processes, such as the cuprammonium process, the deacetylation of cellulose acetate, the denitration of cellulose nitrate, and preferably the viscose process. Tubular casings reinforced with fibers such as, for example, rice paper and the like, hemp, rayon, flax, sisal, nylon, polyethylene terephthalate and the like, are advantageously employed in applications requiring large diameter tubular food casings. Tubular fibrous casings can be made by methods and apparatus described, for example, in U.S. Pat. Nos. 2,105,273; 2,144,899; 2,910,380; 3,135,613; and 3,433,663.

As is well known in the art, tubular cellulosic casings prepared by any one of the well known methods are generally treated with glycerine, as a humectant and softening or plasticizing agent, to provide resistance to drying or cracking of the casing during storage and handling prior to stuffing. The glycerine treatment is usually carried out by passing the casing while still in its gel state through an aqueous glycerine solution, after which the plasticized casing is dried to a predetermined moisture content prior to further processing or winding up on reels for storage. Generally, large size tubular casings will contain about 25% to 35% glycerine based on the weight of dry cellulose, and will have a moisture content of about 5% to 10% prior to being moisturized.

CASING MOISTURE CONTENT

In the preparation and use of artificial food casings, particularly small size casings formed of regenerated cellulose, the moisture content of the casings is of extreme importance. When small size cellulosic casings are made, it is generally necessary that they be dried to a relatively low water content, usually in the range of about 8% to 12% by weight, to enable shirring operations to be carried out without damage to the casings. To permit ready deshirring of the compressed, shirred small size cellulosic casing and prevent tearing and breaking of the casing during stuffing operations, shirred small casings having an average moisture content of between about 14% to 18% by weight are required. This relatively narrow range of moisture content is important because excessive breakage of the casing during stuffing has been found to occur at lower moisture contents, and greater moisture content results in excessive plasticity of the casing material and overstuffing.

A number of patents have issued in recent years dealing with the problem of the moisture content of shirred small size tubular food casings, and suggesting various methods for obtaining the desired moisture level and maintaining it during storage and shipping. For example, in U.S. Pat. Nos. 2,181,329 to Hewitt, 3,250,629 to Turbak, and 3,471,305 to Marbach, packaging means are disclosed which enable a plurality of shirred casing sticks of small size tubular casing to be humidified while packaged. In U.S. Pat. Nos. 3,222,192 to Arnold, 3,616,489 to Voo et al, 3,657,769 to Martinek, and 3,809,576 to Marbach et al various means are disclosed for moisturizing the food casings before or during the shirring operation.

The instant invention is directed to the so-called "large size food casings" which, to stuff properly, require relatively high moisture contents, generally in excess of about 17%. The large size food casings are characterized by relatively thicker walls than small food casing walls and, therefore, require higher moisture content to provide the extensibility required for stuffing operations without causing undesirable levels of internal pressure. This invention generally comprehends the class of casings identified as "large size food casings", and particularly those of the fibrous type.

Large size casings, traditionally supplied in short lengths of substantially dry flattened tubing are quite stiff in the dry state, and are softened for stuffing operations by soaking in water to raise the moisture content to about full saturation. Heretofore there has been no need to supply such casings with any predetermined moisture content, and controlled moisturization by the casing manufacturer in the production of either short cut lengths or long shirred lengths of the large size casings has not been warranted. More recently, however, the wider use of automatic stuffing equipment for products utilizing large size tubular food casings, and the increased demand for supplying such casings in greater lengths in shirred form, as compared to the long used short flat lengths, has emphasized the problems attending moisturizing such casings by soaking just prior to the stuffing operation. Moreover, the need for greater quality control of all aspects of the manufacture and use of large size food casings has become increasingly evident. For example, the uniformity of dimensions of stuffed food casings and food products processed therein has become increasingly important commercially, more specifically, in further processes involving automatic weight and slice count packaging of the product. Casing moisture content has been found to be a factor in control of product uniformity as well as in meeting the need to readily continually and economically stuff the casings, without damage or breakage thereof, and with consistently reproducible results.

Providing shirred small size casings with the relatively narrow range of uniformly distributed moisture content required for stuffing operations has been most efficaciously and economically accomplished by the casing manufacturer during the fabrication, shirring, or packaging of the casings. It has become increasingly evident that the advantages of controlled moisturization enjoyed in the small casings area of the technology could be realized with respect to large casings if means were developed for the casing manufacturer to supply large size casings, both in flattened and shirred forms, which could be readily employed in casing stuffing operations, without the need for soaking procedures just prior to stuffing.

Although, because of the universal acceptance of the prestuffing soaking of large size casings, it has not been found necessary in the past for the casing manufacturer to maintain the moisture content of large size food casings within any particular critical range, it is known, as noted hereinabove, that somewhat higher moisture contents are required to afford the desired flexibility of such casings as compared to those required for the small size casings. Since greater amounts of water and consequent increased weight substantially increases the costs of packaging, handling, storage and shipping the casings, it is important to moisturize the casing to the extent required, but not more than what is necessary.

SPOILAGE MICROORGANISM GROWTH

Another problem which occurs during the handling, storage and processing of high moisture content cellulosic food casings involves the growth of mold, yeast, or bacteria, since high moisture is one of the necessary factors for inducing such growth on cellulosic casings. It is known for example, that cellulosic food casings have a critical moisture content above which the growth of spoilage microorganism during periods of storage is greatly enhanced. Generally the critical moisture content is lower for mold than for yeast and bacteria so that a moisture content preserving casing from mold spoilage will also prevent yeast or bacterial spoilage. Keeping the moisture content of cellulosic casings below a predetermined level, generally below about 17% by weight of moisture based on the total weight of the casing, has been found to be an effective measure to control the development of such growth. The commercial experience has been that no spoilage occurs for such casings; however, such casings must then be further moisturized by soaking prior to stuffing. In cases where limitation of the moisture content cannot be used to inhibit such growth, such as where higher moisture contents are purposefully provided, or where higher moisture concentrations may occur in stored casings due to random temperature differentials across sections of the casing, it is necessary to provide other means to inhibit the growth of spoilage microorganisms.

Consequently, large size tubular cellulosic food casings, and particularly tubular fibrous casings, which may be readily stuffed on modern substantially fully automatic stuffing apparatus, without damage or breakage, may advantageously be provided with (i) moisture contents which afford adequate flexibility and obviate the need for the hitherto customary soaking step just prior to stuffing, and also with (ii) suitable means for inhibiting the growth of molds or other microorganisms during periods of shipping, handling, and storage.

The problem of mold growth in food products due to the presence of nutrients which promote the growth of microorganisms and cause food spoilage has been the subject of a number of studies over the years. Various treatments have been evaluated and recommended, including combinations of sugars and polyhydric alcohols as inhibitors for preventing the growth of microorganisms commonly recognized as being responsible for food spoilage. The antimycotic treatment of cellulose food casings presents additional and more complex problems due to the processing techniques employed in the preparation and stuffing of the casings. Some suggestions for overcoming such problems and achieving antimycotic treatment of casings used for sausage products or, in some instances, to prevent mold growth on the sausage product surface after stuffing, are the subject of the several patents. For example, in U.S. Pat. No. 3,617,312 to Rose, an antimycotic agent is applied to cellulose casings as a component of a curable water-insoluble coating and is used to prevent mold growth in the sausage product surface after stuffing, and in U.S. Pat. No. 3,935,320 to Chiu et al, cured water-insoluble cationic thermo-setting resin coatings applied to the surfaces of casings reduce casing deterioration wrought by the enzymatic action of microorganisms. The co-pending application of Ellis and Chiu, Ser. No. 157,008 filed June 6, 1980, and assigned to the same assignee as this application, discloses the antimycotic treatment of controllably moisturized casings with aqueous solutions of various agents including glycerine, propylene glycol and the propionates and sorbates of potassium, sodium and calcium. Our copending application, Ser. No. 130,190, filed Mar. 13, 1980, relates to the use of chloride salts as antimycotic agents. As used herein, the term "antimycotic" denotes a substance which has a direct poisonous effect on mold organisms apart from its effect on water activity.

The above-mentioned chloride salts possess the disadvantage of tending to corrode the chemical processing equipment in which they are used. The above-mentioned propylene glycol posseses the disadvantage of not being acceptable for use with foodstuffs by the laws of some countries.

The inclusion of moisture in the casing to any extent gives rise to the consideration of, among other things, the phenomenon known as "water activity". Water activity, represented by the symbol $A_w$, is defined as the ratio of the vapor pressure of water in a solution to the vapor pressure of pure water, both measured at the same temperature. It is used in connection with describing the present invention to the extent that it is a convenient and useful parameter to quantify the moisture levels in the casings treated with glycerine according to the technique of the invention. Convenient literature references treating the water activity phenomenon in greater detail are to be found in Ross, Estimation of Water Activity In Intermediate Moisture Foods, *Food Technology*, March 1975, page 26, and in *Journal of Food Science*, Vol. 41, page 532, May-June 1976.

Heretofore, the effects on water activity of glycerine using high levels of glycerine of at least about 40 percent based on the weight of dry cellulose in the casing, have not been explored. The use of glycerine as an additive at high levels would avoid the corrosion problems associated with chloride salts and the foodstuff acceptability problems associated with propylene glycol.

OBJECT OF THE INVENTION

It is an object of the present invention to provide a premoisturized food casing, and a method for making such casing, wherein the casing contains high levels of glycerine in order to controllably lower the water activity, $A_w$, of the casing to a level, commensurate with the particular moisturization level of a given casing, at which mold growth will be inhibited for as long a shelf life as the casing may be expected to have.

This and other objects will become apparent from a reading of the following detailed specification.

SUMMARY OF THE INVENTION

The present invention provides an improved large size tubular cellulosic food casing controllably premoisturized to the extent that it can be stuffed without the addition of further moisture prior to stuffing, and having a moisture content of between about 17 and about 30 weight percent, based on the total weight of the casing. The improvement associated with the casing of the present invention comprises the glycerine content in the casing being at least about 40 weight percent based upon the weight of dry cellulose in the casing, with the proviso that said glycerine content be sufficient to maintain the water activity in the casing at not greater than 0.80.

In another aspect, the invention provides an improved method of making a large size tubular cellulosic food casing which is suitable for stuffing with food product without the further need for pre-stuffing moisturization which method comprises the step of (a) adding moisture to produce a casing having between about 17 and about 30 weight percent moisture based on the total weight of the casing, the improvement comprising the additional step of:

(b) adding sufficient glycerine to the casing such that the casing glycerine content is at least about 40 weight percent based on the weight of dry cellulose in the casing, with the proviso that said glycerine content is sufficient to maintain the water activity in the casing at no greater than 0.80.

DETAILED DESCRIPTION OF THE INVENTION

In general, the invention comprehends a large size tubular fibrous reinforced cellulosic food casing which is promoisturized by adding carefully controlled amounts of moisturizing water to the extent that the casing can be stuffed without the necessity of any pre-stuffing soaking. The amount of the controllably added moisture may be varied to provide a casing having a moisture content ranging from as low as about 17 percent to as high as about 35 percent based on the total weight of the casing. The preferred moisture content range depends on the type of product to be suffered into the casing. For example, for whole boneless hams, the preferred range is from about 20% to about 26% moisture based on total casing weight. For meat emulsions, the preferred range is from about 17% to about 23%. The glycerine content of the casing is at least about 40 (preferably at least about 45) weight percent based on the weight of cellulose in the casing, with the proviso that said glycerine content is sufficient to maintain the water activity in the casing at no greater than 0.80 (preferably not greater than 0.77).

As used herein, the words "total weight of the casing" and "total casing weight" are intended to denote the total weight of water, cellulose and glycerine in the casing, together with optional minor ingredients, if any, that might be present in the casing. As used herein, "moisture content" is the weight percent of water or moisture in the casing based on total casing weight, whereas "glycerine content" is the weight of glycerine in the casing divided by dry weight of cellulose in the casing expressed as the weight percent (%). As used herein, the terms "glycerol" and "glycerine" are used interchangeably.

Illustrative optional minor ingredients that may be present in amounts of less than 50 (preferably less than 25) weight percent in the casing based on the total casing weight would include, for example, moisture barrier coatings, such as vinylidene chloride copolymer coatings; plasticizers and softeners such as oils including animal fatty oils such as lard oil and vegetable fatty oils such as castor oil, or corn oil, soya oil, safflower oil, tung oil; or mineral oil; pigments and fillers such as titanium dioxide; dyes such as the well-known food dyes; antimycotic agents such as propylene glycol, propionate salts, sorbate salts, chloride salts, and the like.

The casings within the scope of the present invention may optionally contain a fibrous support web embedded in the walls of the casing such as the commercially utilized cellulosic support webs.

The casings within the scope of the present invention are typically protected for a year or more under varying temperature conditions generally ranging from about 18° C. or lower to about 27° C. or higher, from mold growth by virtue of the present invention.

The following examples are intended to illustrate, but in no way limit, the present invention.

EXAMPLE 1

In order to demonstrate the effectiveness of glycerine in mold growth inhibition a culture dish mold growth test was conducted.

A conventional potato-dextrose agar solution was used as the base medium into which was incorporated various proportions of glycerine. The agar and the glycerine solutions were sterilized using well known procedures and tartaric acid was added to combined solutions to obtain a pH of about 3.5 in the final agar medium.

The mold culture used as the inoculant in this Example was prepared as follows:

A mixture containing thirty-one different mold spores in a 1% sodium citrate solution was prepared using conventional aseptic procedures with a concentration of about 1 to 5 million mold spores per milliliter of solution. Among the mold cultures included in the mixture were *Aspergillus niger* (ATCC #1004), *Chaetonium globosum* (ATCC #16021), *Memnoniella echinata* (ATCC #11973), *Myrothecium verrucaria* (ATCC #9095), *Trichoderma viride* (ATTC #26921), and *Whetzelinia sclerotiorum* (ATCC #18657). Also included were mold spores of nine mold cultures that were isolated from mold contamination found on various cellulosic food casings, and mold spores of sixteen mold cultures that were isolated as naturally occurring airborne contaminants obtained from within casing manufacturing sites.

Test solutions of the agar medium and mold inoculum were prepared with glycerine, in concentrations of 5%, 7.5%, 10%, 12.5%, 15%, 17.5%, 20%, 22.5%, 25%, 27.5%, 30%, 32.5%, 35%, 37.5%, 40%, 50%, and 60% by weight.

The inoculated test solutions were stored in covered dishes for seven days at ambient temperature and visually observed for any growth of mold. Glycerine was found to inhibit mold growth in concentrations of 40% or greater.

EXAMPLE 2

This example shows that high moisture fibrous sausage casings can be preserved by incorporating glycerol into the casings in sufficient quantity to prevent the growth of spoilage organisms such as molds. This example shows that 45% glycerol (cellulose weight basis) would prevent spoilage of 20% moisture casing (total casing weight basis) with an adequate safety factor.

In the preparation of casings for this example, a group of size 8 shirred tubular fibrous casings having a recommended stuffed diameter of 4.76 inches was prepared with the proportions of ingredients as shown in Table I. Moisture and glycerol contents were varied by spraying glycerol-water solutions over the surface of the casings.

Water activity values ($A_w$) were calculated by the method of Sloan and Labuza (*Journal of Food Science* volume 41, page 532 (1976); *Food Product Development*, December 1975, page 68).

The casings were shirred, compressed to give 175 feet of casing in a 24 inch length, and retained in an elastic sheathing material.

Mold suspensions were used in a challenge experiment where casings were inoculated with mold suspensions and incubated at a constant 35° C. for observation of visible mold growth. Used in this example were separate suspensions of *Aspergillus niger* (ATCC 1004), a mold which grows well on high moisture fibrous casings, *Aspergillus glaucus*, which has been used as a challenge organism in studies with intermediate moisture foods, *Geotricum candidum*, a mold which has been used as an indicator of good sanitation of food processing equipment, and a Penicillium mold species found particularly adaptable to varying growth conditions in high moisture casings.

An additional mixed suspension was prepared which included the above mold cultures and the following additional mold cultures:

*Chaetonium globosum* (ATCC #16021), *Memnoniella echinata* (ATCC #11973), *Myrothecium verrucaria* (ATCC #9092), *Trichoderma viride* (ATCC #26921), and *Whetzelinia sclerotiorum* (ATCC #18657). Also included were mold spores of nine mold cultures that were isolated from mold contamination found on various cellulosic food casings, and mold spores of sixteen mold cultures that were isolated as naturally occurring airborne contaminants obtained from within casing manufacturing sites.

The suspensions contained one to five million colony forming units per milliliter of 1% aqueous sodium citrate and were prepared using conventional aseptic procedures.

Casing samples were inoculated on the outer surface by brushing several milliliters of the mold suspension in a ½ inch wide strip that extended along the length of the shirred stick. All of the mold suspensions were inoculated into separate strips on one shirred length of casing. After inoculation the inoculated casing was cut into five slices perpendicular to the length of the shirred stick. Each slice was placed into a separate one quart wide mouth canning jar and the closed jar stored at constant 35° C. The mold growth results after storage for five, seven and twelve months are shown in Table I. Results were recorded positive if visible mold growth appeared in the five areas where the separate mold suspensions were inoculated. Results were negative if mold growth was not visible in any of the inoculated areas. No mixture of positive and of negative results occurred. Growth results were always either positive on all five slices in all inoculated areas or the growth results were negative on all five slices in all inoculated areas.

TABLE I

Mold growth observations on high moisture fibrous sausage casings preserved with glycerol

| Casing Sample | Glycerol (% of bone dry weight) | Moisture (% of total casing weight) | Calculated water activity ($A_w$) | Visible mold growth at 35° C.[a] 5 Mos. | 7 Mos. | 12 Mos. |
|---|---|---|---|---|---|---|
| A | 28.4 | 19.7 | 0.80 | − | − | − |
| B | 46.8 | 33.5 | 0.86 | − | − | − |
| C | 38.9 | 30.9 | 0.86 | − | [b] | + |
| D | 28.2 | 30.8 | 0.88 | − | + | + |
| E | 42.1 | 33.4 | 0.86 | − | − | + |
| F | 44.5 | 27.0 | 0.81 | − | − | − |
| G | 41.4 | 34.2 | 0.87 | + | + | + |
| H | 39.1 | 29.4 | 0.85 | + | + | + |

TABLE I-continued
Mold growth observations on high moisture fibrous sausage casings preserved with glycerol

| Casing Sample | Glycerol (% of bone dry weight) | Moisture (% of total casing weight) | Calculated water activity ($A_w$) | Visible mold growth at 35° C.[a] | | |
|---|---|---|---|---|---|---|
| | | | | 5 Mos. | 7 Mos. | 12 Mos. |
| I | 30.8 | 31.8 | 0.88 | + | + | + |

[a] + = visible mold growth; — = no visible mold growth.
[b] Faint moldy smell, but no visible mold growth.

The casing with the lowest water activity which showed mold growth at the fixed storage temperature of 35° C. was casing H with an $A_w$ of 0.85. Three (casings G, H, and I) of the seven casings (casings B, C, D, E, G, H, I) with an $A_w$ of 0.85 or above showed visible mold growth after five months storage at 35° C. and 6 of 7 showed mold growth after 12 months. Accordingly, an $A_w$ below 0.85 would be required to prevent mold growth at a fixed temperature of 35° C. Casing A ($A_w$ 0.80) and F ($A_w$ 0.81) did not show visible mold growth.

A casing with 45% glycerol (dry cellulose weight basis) and 20% moisture (total weight basis) would have an $A_w$ of 0.75. This example shows that such a casing would not support mold growth. For such a casing an adequate safety factor for preservation exists. The safety factor will promote preservation despite any areas of high moisture which may exist due to exposure to temparature variation during shipping or storage.

Additional casings were prepared and tested in accordance with the above procedure in order to determine the proper range for $A_w$ under typical variable "storage shed" ambient temperature conditions. Casings haivng a moisture content from 17 to 27 wt. %, based on total casing weights, and glycerine levels of 22 to 80 wt. %, based on dry cellulose in the casings, were tested. The results indicated that at below an $A_w$ of 0.80 mold growth wall generally not occur after 1 year storage at variable temperature. The results also showed that mold growth definitely will not occur for an $A_w$ below 0.77, whereas it will occur at an $A_w$ above 0.80 under such variable temperature conditions.

EXAMPLE 3

This example shows that preservation of high moisture no-soak fibrous casings from mold spoilage results when glycerol solution is added directly to the bore of shirred casing. The direct addition of glycerine to shirred casing contrasts to the customary and preferred method of addition by uniform spraying of glycerol sulution onto the casing prior to shirring.

In the preparation of casings for this example, six-inch shirred lengths of Size 8 shirred tubular fibrous sausage casing having a maximum stuffing diameter of 4.76 inches, a moisture content of 12.0% of the total weight, and a glycerol content of 29.5% of the casing cellulose were used. To prepare casings of varied moisture and glycerol contents, water or glycerol solution was added to the bore of the shirred casing. The addition was made as uniformly as possible throughout the length of the shirred casing and the casing was rotated along its axis after the addition to permit the glycerol solution to soak into the casing as uniformly as possible. In spite of these precautions, a tendency for the glycerol solution to pocket or collect in shirring folds was noted.

The pocketing of glycerol is a potentially serious problem since an uneven application of the glycerol to the casing might indicate that there are portions of the casing having insufficient amounts of glycerol therein and therefore portions which are insufficiently protected from mold growth. However, the casing samples of the present example were allowed to equilibrate over a four week period, during which time the glycerol pockets disappeared. No mold growth occurred during the equilibration period.

After a four-week equilibration period in a polyethylene bag, the casing samples were inoculated with mold cultures, subdivided, stored at 35° C., and observed for visible mold growth as described in Example 2, above, and the results are seen in Table II which follows:

TABLE II
Preservation of high moisture no-soak shirred fibrous sausage casing by addition of moisturizing and glycerol solution to the bore of shirred casing.

| Casing | Casing Variables | | | Visible mold growth after 13 months at 35° C. (+ = growth; — = no growth) |
|---|---|---|---|---|
| | Moisture (% of Total) | Glycerol (% of cellulose) | Calculated water activity | |
| A | 34.0 | 30.0 | 0.89 | + |
| B | 34.0 | 37.0 | 0.88 | + |
| C | 29.0 | 30.0 | 0.87 | + |
| D | 34.0 | 51.0 | 0.85 | + |
| E | 22.4 | 45.6 | 0.77 | — |
| F | 22.0 | 45.9 | 0.76 | — |
| G | 17.7 | 46.7 | 0.71 | — |

The results as presented in Table II above show that at the given moisture levels, mold growth did not occur when the casing had a glycerol content of 45.6 and an $A_w$ of 0.77, (casing E), whereas mold growth did occur at a glycerol content of 51.0% and an $A_w$ of 0.85.

I claim:

1. In an improved large size tubular cellulosic food casing controllably premoisturized to an extent that it can be stuffed without the addition of further moisture prior to stuffing, and having a moisture content of between about 17 and about 30 weight percent, based on the total weight of said casing, the improvement comprising the glycerine content in the casing being at least about 40 weight percent based on the total weight of dry cellulose in said casing, with the proviso that said glycerine content is sufficient to maintain the water activity in the casing at not greater than 0.80.

2. An improved casing of claim 1 which consists essentially of water, cellulose and glycerine.

3. An improved casing of claim 1 wherein the water activity is not greater than 0.77.

4. An improved casing of claim 1 wherein a fibrous support web is embedded in the walls of the casing.

5. An improved method of making a large size tubular cellulosic food casing for stuffing with food product without the further need for pre-stuffing moisturization which method comprises the step of:
(a) adding moisture to produce a casing having between about 17 and about 30 weight percent moisture based on the total weight of casing, the improvement comprising the additional step of:
(b) adding sufficient glycerine to the casing such that the casing glycerine content is at least about 40 weight percent based on the weight of dry cellulose in the casing, with the proviso that said glycerine content is sufficient to maintain the water activity in the casing at no greater than 0.80.

6. An improved method of claim 5 wherein the casing consists essentially of water, cellulose and glycerine.

7. An improved method of claim 5 wherein the water activity is not greater than 0.77.

8. An improved method of claim 5 wherein a fibrous support web is embedded in the walls of the casing.

9. In a process for preparing an encased food product having a stuffed diameter of not less than about 50 millimeters, wherein a large sized tubular cellulosic food casing having fibrous web embedded in its wall is provided, having a preadjusted moisture content of between about 17 and about 30 weight percent moisture based on the total weight of casing to impart to said casing sufficient extensibility and flexibility for the casing to be stuffed with a foodstuff without the addition of further moisture, and wherein said casing is stuffed with said foodstuff to form said encased food product, the improvement comprising incorporating into said casing a sufficient amount of glycerine such that the casing glycerine content is at least about 40 weight percent based on the weight of dry cellulose in the casing, with the proviso that said glycerine content is sufficient to maintain the water activity in the casing at no greater than 0.80, and stuffing said casing to form said encased food product without adding further moisture to said casing prior to said stuffing.

10. An improved method of claim 9 wherein the water activity is not greater than 0.77.

* * * * *

UNITED STATES PATENT AND TRADEMARK OFFICE
CERTIFICATE OF CORRECTION

PATENT NO. : 4,409,251
DATED : October 11, 1983
INVENTOR(S) : Thomas E. Higgins

It is certified that error appears in the above-identified patent and that said Letters Patent are hereby corrected as shown below:

Column 6, line 21, change "promoisturized" to read --premoisturized--.

Column 6, line 29, change "suffered" to read --stuffed--.

Column 7, line 30, change "ATTC" to read --ATCC--.

Column 9, line 33, change "haivng" to read --having--.

Column 9, line 38, change "wall" to read --will--.

Signed and Sealed this

Seventeenth Day of January 1984

[SEAL]

Attest:

GERALD J. MOSSINGHOFF

Attesting Officer

Commissioner of Patents and Trademarks